United States Patent [19]
Burdick

[11] 4,341,132
[45] Jul. 27, 1982

[54] CONTINUOUSLY VARIABLE RATIO POWER TRANSMISSION

[76] Inventor: Clayton J. Burdick, 2814 Atadero Ct., Carlsbad, Calif. 92008

[21] Appl. No.: 234,244

[22] Filed: Feb. 13, 1981

[51] Int. Cl.³ .................. F16H 47/04; F16H 37/06
[52] U.S. Cl. .................................... 74/687; 74/681
[58] Field of Search ...................... 74/677, 687, 681

[56] References Cited

U.S. PATENT DOCUMENTS

| | | | |
|---|---|---|---|
| 2,153,997 | 4/1939 | Verderber et al. | 74/687 |
| 2,336,912 | 12/1943 | Zimmermann | 74/687 |
| 2,485,126 | 10/1949 | Wood | 74/687 X |
| 2,517,188 | 8/1950 | Feng | 74/687 |
| 2,580,946 | 1/1952 | Orshansky, Jr. et al. | 74/687 |
| 2,599,814 | 6/1952 | Cull | 74/687 |
| 2,830,468 | 4/1958 | Waring | 74/687 |
| 3,298,251 | 1/1967 | Moss | 74/687 |
| 3,396,607 | 8/1968 | Ross | 74/687 |
| 3,411,381 | 11/1968 | Orshansky, Jr. | 74/687 |
| 3,455,184 | 7/1969 | Frandsen et al. | 74/687 |
| 3,503,281 | 3/1970 | Gsching et al. | 74/687 X |
| 3,626,787 | 12/1971 | Singer | 74/687 |
| 3,851,544 | 12/1974 | Herman | 74/687 X |
| 4,134,310 | 1/1979 | Orshansky, Jr. et al. | 74/687 |

FOREIGN PATENT DOCUMENTS

| | | | |
|---|---|---|---|
| 245707 | 7/1963 | Australia | 74/687 |
| 1755161 | 4/1970 | Fed. Rep. of Germany | 74/687 |
| 2829304 | 1/1980 | Fed. Rep. of Germany | 74/687 |
| 1284845 | 1/1962 | France | 74/687 |
| 924185 | 4/1963 | United Kingdom | 74/687 |

*Primary Examiner*—Leslie Braun
*Attorney, Agent, or Firm*—Ralph S. Branscomb

[57] ABSTRACT

A power transmission is provided characterized by smoothly and continuously variable gear ratios between the input and output shaft by incorporating a no-load restraint means for the ring gear of a ring, planetary and sun gear transmission system, the restraint comprising a wobble plate pump operative in a closed liquid circuit and driven by said ring gear to impose a restraint on same which varies according to an external control of the angle of the wobble plate and also including a second wobble plate pump in the same closed line or loop as the first pump and which is driven by the output shaft and whose liquid displacement capabilities per cycle is determined as a function of the wobble plate angle which may be controlled either manually or by the pressure at the liquid output line from the first pump.

2 Claims, 3 Drawing Figures

U.S. Patent  Jul. 27, 1982  4,341,132
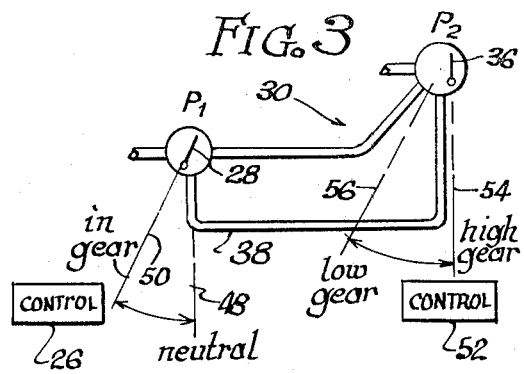
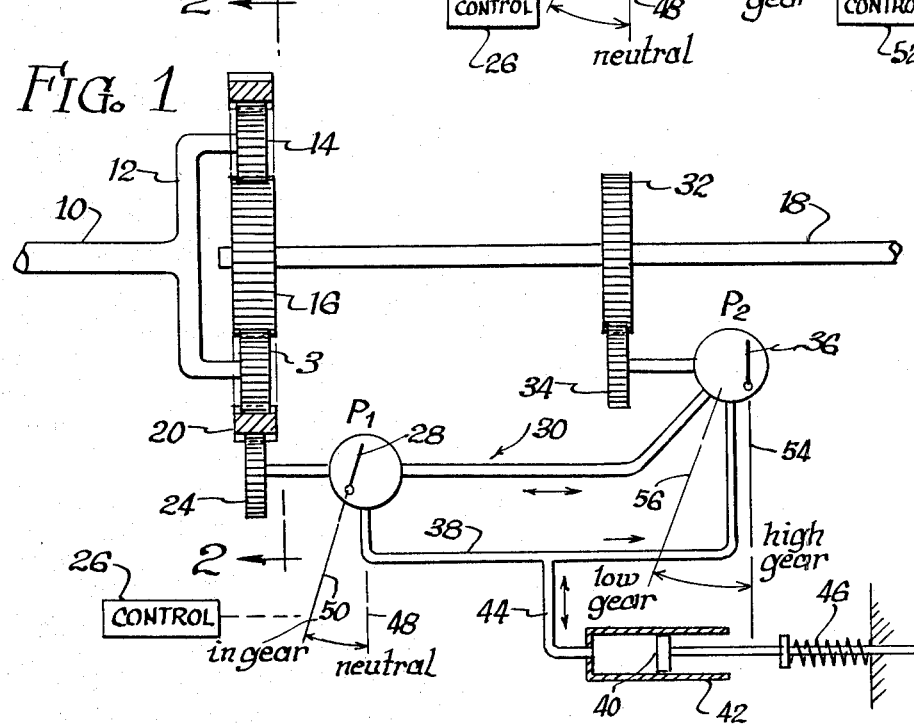
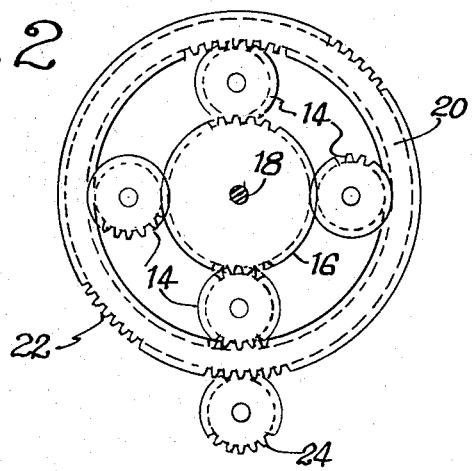

CONTINUOUSLY VARIABLE RATIO POWER TRANSMISSION

BACKGROUND OF THE INVENTION

It is well known that a continuously variable gear ratio can be established between an input and an output shaft through the use of sun and planetary gears coupled respectively to the shafts with the planetary gears being surrounded by a ring gear the rotational speed of which is controlled to vary the ratio.

Any means of controlling the speed of the ring gear will equally effectively alter the gear ratio. In one arrangement, the outer edge of the ring gear is provided with gear teeth which mesh with another idler gear, together defining a gear pump. A continuous hydraulic loop with a variable restriction connects the input and output of the resulting pump, and thus by varying the restriction, varying resistance can be applied to the ring gear. This system permits continuously varying the ratios quite effectively, but suffers from certain shortcomings in that there is no feedback mechanism incorporated in this system, nor is there any capability of putting the mechanism into overdrive mode as the ring gear and pump are passive and the ring gear cannot be made to exceed the speed at which it is driven by the other gears. In addition, all the work performed to pump the liquid through a restriction is wasted.

SUMMARY OF THE INVENTION

The present transmission utilizes the continuously variable ratio advantage of the solar, planetary and ring gear combination but utilizes a control means comprising two pumps, which are preferably wobble plate pumps. The advantage of a wobble plate pump in this application lies in its dual flow determining inputs, that is, flow control can be effected through varying the rotational speed of the wobble plate, or by changing the wobble plate's angle on its rotational shaft which yields it in effect two multiplicitive inputs.

The first pump is operated directly from the ring gear and is controlled directly by the operator of the piece of equipment, or the driver of the vehicle, in which the transmission is installed. Control is effected by a mechanism for adjusting wobble plate angle on its rotary shaft, such that a slight increase in wobble plate angle will multiply the displacement of the pump and increase the restraint on the ring gear. This acts as a clutch in addition to changing the system from neutral to an in-gear condition.

Although a single pump disposed in a continuous hydraulic loop would work, other features of the invention smooth out the transition and incorporate some degree of feedback and automatic control into the mechanism. These features include a second wobble plate pump which is driven off of the output shaft from the transmission and a control for the plate angle of the second wobble plate which is either operated manually or as a function of the outlet pressure at the first pump, both of these control devices having the effect of smoothing the transition over a range of gear ratios and avoiding undesireable sudden shifts.

BRIEF DESCRIPTION OF THE DRAWINGS

FIG. 1 is a diagrammatic illustration of the transmission;

FIG. 2 is a section taken along line 2—2 of FIG. 1.

FIG. 3 is a diagrammatic illustration of a modification utilizing a manual control for the wobble plate setting of the second pump.

DETAILED DESCRIPTION OF THE PREFERRED EMBODIMENT

As shown in FIG. 1, the power input shaft 10 which ordinarily comes from the engine connects to a spider 12 mounting planetary gears 14 rotationally so that they are free to orbit around and in engagement with sun gear 16 mounted on the power output shaft 18. The sun and the planetary gears, of course, are rotationally dependent, but no motion will be transmitted from one shaft to the other without the ring gear 20 which encircles the planetary gears. If this ring is allowed to freewheel, there is no power transmission from the input shaft to the output shaft at all. As the ring gear is increasingly restrained, the restrainng force is transmitted through the planetary sun gears to the output shaft to supply working torque to the mechanism. As the restraint is increased the transmission continuously shifts from "low gear" into "high gear". Under normal circumstances, low gear is infinitely low because output shaft speed is zero, and high gear is a ratio on the order of two-to-one with the exact ratio being a function of the relative sizes of the sun and ring gears.

The exterior edge 22 of the ring gear 20 is toothed and engages a pump drive spur gear 24 which operates pump P-1. In the instant invention this pump must be of the type with a volume control input other than shaft speed, and although other types of pumps are conceiveable which have this dual input, a wobble plate pump will be described throughout the instant disclosure.

The operator of the transmission by means of some type of control 26, the exact nature of which is not part of this invention, controls the angle of the wobble plate 28 on its shaft. This relationship again is diagrammatic and intended to indicate any suitable implementation of the wobble plate control function.

Pump P-1 connects to a closed hydraulic line or loop 30 which incorporates a flow restriction mechanism to be detailed below. Thus it can be seen that, because of this flow restriction, the restraint on the ring gear imposed by its direct connection to the shaft of the plate of the wobble plate pump will be a function of wobble plate angle and thus the transmission engagement can be controlled from the control 26.

Other than line resistance, flow restriction is accomplished in the line 30 by means of the pump P-2 driven by shaft spur gear 32 which engages power takeoff spur 34 to directly drive the shaft of the wobble plate 36. It can be seen that the pump P-2, being a positive displacement pump, will variably restrain the pump P-1, depending again on two factors: First, and primarily in this instance, the angle of the wobble plate 36, and second, under certain circumstances the driving speed of the wobble plate shaft.

The angle of the wobble plate 36 which as indicated is the chief control of the flow restriction in the hydraulic line, is controlled by a pressure sensor sensitive to the pressure in the output line 38 of the hydraulic loop. Although other means of implementing this sensing are, of course, conceiveable, one effective and extremely simple means is the utilization of a piston or plunger 40 riding in a hydraulic cylinder 42 directly linked to the output line 38 by a secondary line 44. Movement of this piston under hydraulic force is resisted by a spring 46 or the equivalent, the strength and positioning of which is, of course, critical to the overall range in which the gear ratios lie. The effect of the piston is to increase the angle of the second wobble plate 36 as a function of the pressure in the hydraulic line 38 which is also a function of the restraint placed on pump P-1 and thus the ring gear.

This incorporates a more complex function of ratio control by buffering somewhat the effect of the control 26. Sudden applications of angle increase to the first wobble plate 28 would otherwise cause a sudden buildup of pressure in the line 38 which would be eased at higher RPM's as the speed of the output shaft 18 sped up the pump P-2. However, when such a control change is first made, before vehicle or equipment speed has changed substantially, the increased pressure in line 38 would undesireably cause a lurching of the system into a higher gear than would be desireable. With the incorporatio of the cylinder and buffer system, this transition is smoothed considerably, permitting the system to rise more gradually into a higher gear, thus permitting shaft speed to build and relieve the back pressure caused by the pump P-2.

Therefore, taking the system at rest when both of the wobble plates are at right angles on their drive shafts, there will, of course, be no output from the first wobble plate pump P-2. The pump shaft will rotate without resistance, allowing the planetary gears 14 to execute their planetary orbital motion without transmitting any torque through to the output shaft 18. If now the operator through his control 26 moves the wobble plate 28 of the first pump P-1, then liquid under pressure flows through the conduit outlet line 38 and into the line 44. The piston 40 then moves to the right, forcing the wobble plate 36 to a position that will cause it to pump, and transmit fluid in the closed loop 30. Simultaneously, a restraint has been placed on ring gear 20 which causes the shaft 18 to rotate which in turn rotates pump P-2, causing the wobble plate 36 to function. In effect, the second wobble plate pump P-2 is acting as a metering device whose flow-restraining capabilities are buffered both by incorporation of the wobble plate buffer system of cylinder 42 and by the feedback inherent in the power coupling of pump P-2 to the output shaft.

FIG. 3 shows a modification of the system control wherein control 26 is expressly provided solely to operate the pump P-1 between neutral, indicated at 48, and engaged position, indicated at 50, by changing the wobble plate angle between orthonormal on its shaft and a pre-determined non-orthornormal angle. This configuration, in which no gear ration variation other than neutral or fully engaged is possible in pump P-1, is also inherent in the embodiment of FIG. 1 as mentioned above. The P-2 control of the FIG. 3 embodiment is not the automatic cylinder type of FIG. 1 but is rather a manual control 52 which continuously shifts the angle of the wobble plate from a high gear position 54 with an orthornormal wobble plate, stopping fluid flow completely and freezing ring 20, to low gear position 56 wherein maximum flow is made possible with the ring gear 20 rotating.

As thus set forth, and within the parameters for change indicated, the transmission described and claimed herein provides a smooth, continuous shift mechanism having built-in possibilities for overdrive and reverse and which, due to the introduction of the dual buffer system, allows transition up or down the ratio range smoothly and without lurching or undesireable overcompensations.

What is claimed is:

1. A clutchless, direct-drive transmission comprising:
   (a) input and output shafts linked through sun and planetary gears;
   (b) a ring gear engaged on said planetary gears for controlling the relative rotation of said shafts;
   (c) a first wobble plate pump and a liquid-filled closed line connecting the inlet and outlet of said pump said pump being operatively connected to said ring gear to concomitantly exert a variable restraining force on, and be driven by, said ring gear;
   (d) externally operable control means for varying the fluid displacement per cycle of said first pump;
   (e) a second wobble plate pump installed in said line to variably restrain the flow of fluid in said line to provide another control input to restraint placed on said ring gear, said second pump being driven by said output shaft to feed back output shaft speed into the ring gear restraint function;
   (f) said externally operable control means comprising means to change the angle of the wobble plate of said first pump, and including means to vary the angle of the wobble plate of said second pump as a function of the fluid flow producted by said first pump; comprising pressure sensor operatively connected to the output of said first pump such that increased sensed pressure directly increases the angle of said wobble plate; and,
   (g) said pressure sensor comprising a cylinder with a fluid tap tube communicating with the output of said first pump and including a piston in said cylinder mechanically linked to said second wobble plate.

2. Structure according to claim 1 wherein the neutral position of said piston positions said second wobble plate in orthornormal position.

* * * * *